United States Patent
Weldon et al.

(10) Patent No.: US 6,553,975 B2
(45) Date of Patent: Apr. 29, 2003

(54) METHOD OF OPERATING A FUEL TANK ISOLATION VALVE

(75) Inventors: Craig Weldon, Chatham (CA); Alfred Schneider, Blenheim (CA)

(73) Assignee: Siemens Automotive Inc. (CA)

(*) Notice: Subject to any disclaimer, the term of this patent is extended or adjusted under 35 U.S.C. 154(b) by 0 days.

(21) Appl. No.: 09/923,796

(22) Filed: Aug. 8, 2001

(65) Prior Publication Data

US 2002/0088440 A1 Jul. 11, 2002

Related U.S. Application Data

(60) Provisional application No. 60/237,879, filed on Oct. 4, 2000, provisional application No. 60/232,348, filed on Sep. 14, 2000, and provisional application No. 60/223,760, filed on Aug. 8, 2000.

(51) Int. Cl.$^7$ .............................................. F02M 37/04
(52) U.S. Cl. ........................................ 123/518; 123/520
(58) Field of Search ................................ 123/516, 518, 123/519, 520

(56) References Cited

U.S. PATENT DOCUMENTS

| | | | | |
|---|---|---|---|---|
| 4,343,281 A | * | 8/1982 | Uozumi ..................... | 123/519 |
| 4,483,369 A | | 11/1984 | Akagi et al. ............. | 137/625.12 |
| 5,067,468 A | * | 11/1991 | Otowa ....................... | 123/516 |
| 5,211,151 A | * | 5/1993 | Nakamima et al. ......... | 123/520 |
| 5,390,703 A | | 2/1995 | Tengesdal ................. | 137/629 |
| 5,441,031 A | * | 8/1995 | Kiyomiya et al. .......... | 123/518 |
| 5,629,660 A | | 5/1997 | Kenyon et al. ............. | 335/227 |
| 5,676,116 A | * | 10/1997 | Kim ......................... | 123/518 |
| 5,692,480 A | * | 12/1997 | Kato et al. ................ | 123/519 |
| 6,016,792 A | * | 1/2000 | Kawano et al. ............ | 123/520 |
| 6,021,997 A | | 2/2000 | Hell ........................ | 251/30.04 |
| 6,374,811 B1 | * | 4/2002 | Mancini .................... | 123/519 |

OTHER PUBLICATIONS

U.S. patent application No. 09/960,732, Craig Weldon et al., filed Sep. 24, 2001.
U.S. patent application No. 09/960,718, Craig Weldon et al., filed Sep. 24, 2001.
U.S. patent application No. 09/931,373, Craig Weldon et al., filed Aug. 17, 2001.
U.S. patent application No. 09/923,792, Craig Weldon et al., filed Aug. 8, 2001.
U.S. patent application No. 09/923,790, Craig Weldon et al., filed Aug. 8, 2001.
U.S. patent application No. 09/923,789, Craig Weldon et al., filed Aug. 8, 2001.
U.S. patent application No. 09/923,788, Craig Weldon, filed Aug. 8, 2001.
U.S. patent application No. 09/863,756, Craig Weldon et al., filed May 24, 2001.
PCT International Search Report; PCT/CA01/00771; Dec. 17, 2001.

* cited by examiner

Primary Examiner—Thomas N. Moulis

(57) ABSTRACT

A method of operating a fuel tank isolation valve. The fuel tank isolation valve has a first port, a second port, an electric actuator, and a valve body. The first port is in fluid communication with a fuel vapor collection canister. The second port is in fluid communication with a fuel tank. And the electric actuator moves the valve body to control fluid communication between the first and second ports. The method includes supplying a first electric signal to the electric actuator such that the valve body permits substantially unrestricted fuel vapor flow between the first and second ports, supplying a second electric signal to the electric actuator such that the valve body substantially prevents fuel vapor flow between the first and second ports, and supplying a third electric signal to the electric actuator such that the valve body provides restricted fuel vapor flow between the first and second ports.

18 Claims, 8 Drawing Sheets

METHOD OF OPERATING A FUEL TANK ISOLATION VALVE

CLAIM FOR PRIORITY

This application claims the benefit of the earlier filing dates of U.S. and Provisional Applications Nos. 60/223,760 (filed Aug. 8, 2000), 60/232,348 (filed Sep. 14, 2000), and 60/237,879 (filed Oct. 4, 2000), which are hereby incorporated by reference in their entirety. This application also claims the benefit of U.S. patent application Ser. No. 09/863,756 (filed May 24, 2001).

FIELD OF THE INVENTION

This disclosure generally relates to a method for operating an isolation valve. In particular, this disclosure relates to a method of operating a fuel tank isolation valve for controlling fuel vapor flow between a fuel tank and a fuel vapor collection canister.

BACKGROUND OF THE INVENTION

It is believed that prior to legislation requiring vehicles to store hydrocarbon vapors that are generated when refueling a vehicle, a simple orifice structure was used to maintain a positive pressure in a fuel tank to retard vapor generation. It is believed that such orifice structures could no longer be used with the advent of requirements controlling on-board refueling. It is believed that, on some vehicles, the orifice structure was simply deleted, and on other vehicles, the orifice structure was replaced with a diaphragm-actuated pressure relief valve. It is believed that these diaphragm-actuated valves suffer from a number of disadvantages including that the calibration (i.e., pressure blow-off level) changes with temperature and age.

It is believed that it is necessary on some vehicles to maintain an elevated pressure in the fuel tank to suppress the rate of fuel vapor generation and to minimize hydrocarbon emissions to the atmosphere. It is believed that under hot ambient temperature conditions or when the fuel is agitated, e.g., when a vehicle is operated on a bumpy road, the amount of fuel vapor generated can exceed the amount of fuel vapor that can be purged by the engine. It is believed that a carbon canister can become hydrocarbon saturated if these conditions occur and are maintained for an extended period. It is believed that such a hydrocarbon saturated carbon canister is unable to absorb the additional fuel vapors that occur during vehicle refueling, and that hydrocarbon vapors are released into the atmosphere. A legislated standard has been set for the permissible level of free hydrocarbons that may be released. A so-called "shed test" is used to measure the emission of the free hydrocarbons for determining compliance with the legislated standard.

It is believed that there is a need to provide a method for operating a fuel tank isolation valve that overcomes the drawbacks of orifice structures and diaphragm-actuated pressure relief valves. Moreover, it is believed that there is a need to provide a method for operating a fuel tank isolation valve that maintains an elevated pressure in a fuel tank and isolates the fuel tank from direct purging.

SUMMARY OF THE INVENTION

The present invention provides a method of operating a fuel tank isolation valve. The fuel tank isolation valve has a first port, a second port, an electric actuator, and a valve body. The first port is in fluid communication with a fuel vapor collection canister. The second port is in fluid communication with a fuel tank. And the electric actuator moves the valve body to control fluid communication between the first and second ports. The method includes supplying a first electric signal to the electric actuator such that the valve body permits substantially unrestricted fuel vapor flow between the first and second ports, supplying a second electric signal to the electric actuator such that the valve body substantially prevents fuel vapor flow between the first and second ports, and supplying a third electric signal to the electric actuator such that the valve body provides restricted fuel vapor flow between the first and second ports.

BRIEF DESCRIPTION OF THE DRAWINGS

The accompanying drawing, which is incorporated herein and constitutes part of this specification, illustrates an embodiment of the invention, and, together with the general description given above and the detailed description given below, serves to explain the features of the invention.

DETAILED DESCRIPTION OF THE PREFERRED EMBODIMENTS

Figure 1:
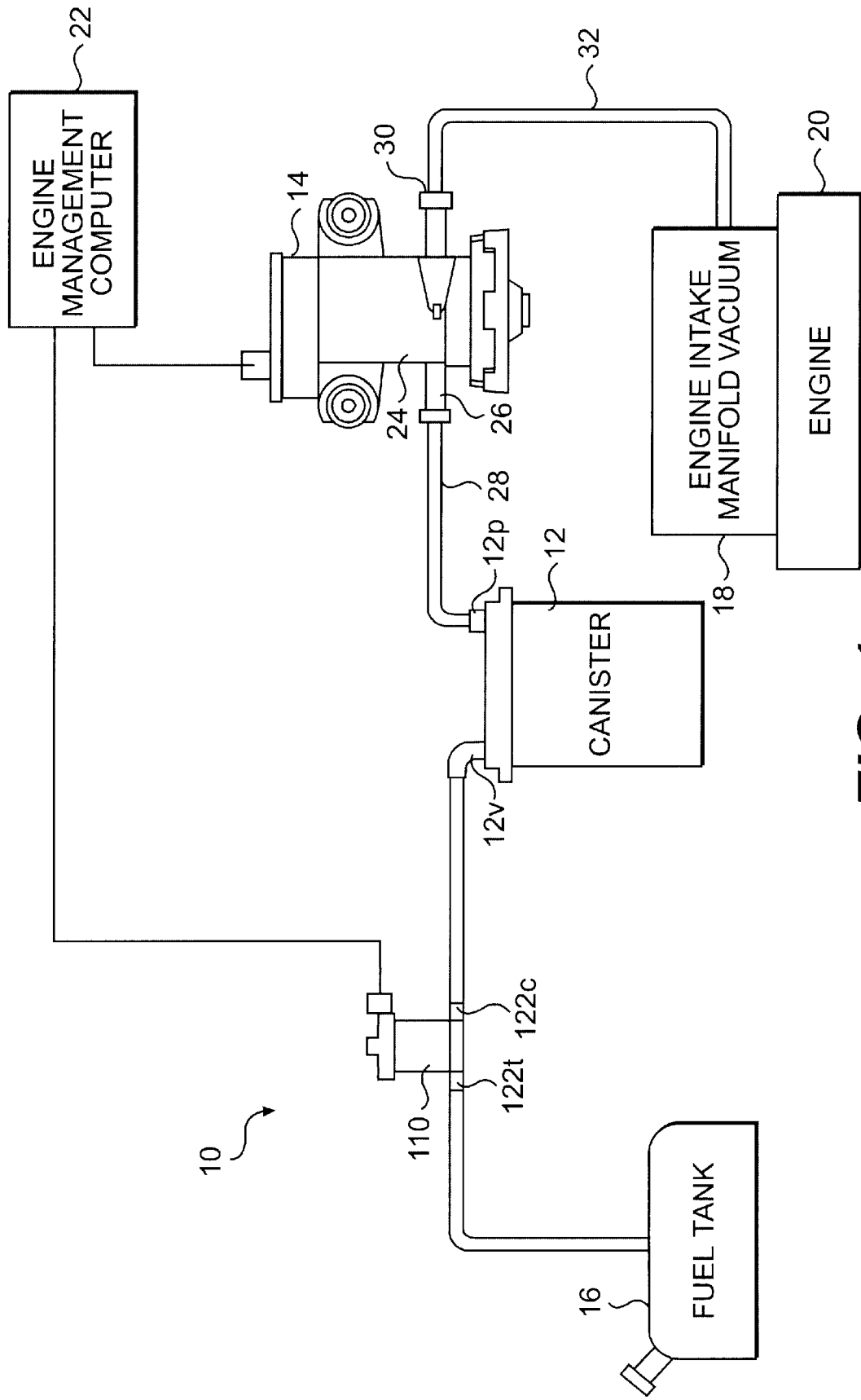
FIG. 1 is a schematic illustration of an evaporative emission control system including a fuel tank isolation valve.

Referring initially to FIG. 1, an evaporative emission control system 10, e.g., for a motor vehicle, includes a fuel vapor collection canister 12, e.g., a carbon or charcoal canister, and a canister purge solenoid valve 14 connected in series between a fuel tank 16 and an intake manifold 18 of an internal combustion engine 20. An engine control management computer 22 supplies a purge valve control signal for operating canister purge solenoid valve 14.

Canister purge solenoid valve 14 preferably includes a housing 24 having an inlet port 26 and an outlet port 30. The inlet port 26 is in fluid communication, via a conduit 28, with a purge port 12p of the fuel vapor collection canister 12. The outlet port 30 is in fluid communication, via a conduit 32, with intake manifold 18. An operating mechanism is disposed within the housing 24 for opening and closing an internal passage that provides fluid communication between the inlet port 26 and the outlet port 30. The mechanism includes a spring that biases a valve element to a normally closed arrangement, i.e., so as to occlude the internal passage between the inlet port 26 and the outlet port 30. When the operating mechanism, e.g., a solenoid, is energized by a purge valve control signal from the engine control management computer 22, an armature opposes the spring to open the internal passage so that flow can occur between the inlet port 26 and the outlet port 30.

The canister purge solenoid valve 14 can be used to purge free hydrocarbons that have been collected in the fuel vapor collection canister 12. The free hydrocarbons that are purged from the fuel vapor collection canister 12 are combusted by the internal combustion engine 20.

A fuel tank isolation valve 110 is connected in series between a vapor dome or headspace, i.e., the gaseous portion within the fuel tank 16, and a valve port 12v of the fuel vapor collection canister 12.

A vapor dome pressure level that is approximately 10" water above atmospheric pressure has been determined to suppress fuel vapor generation in the fuel tank 16. A fuel tank pressure sensor (not shown) can be used to detect pressures in excess of this determined level. The fuel tank pressure sensor can be integrated into the fuel tank isolation valve 110, or can be provided independently of the fuel tank isolation valve 110. When excess pressure is detected, the fuel tank isolation valve 110 is supplied an electrical signal from the engine control management computer 22 that results in the fuel tank isolation valve 110 opening to decrease pressure to or slightly below the determined level.

Figure 2:
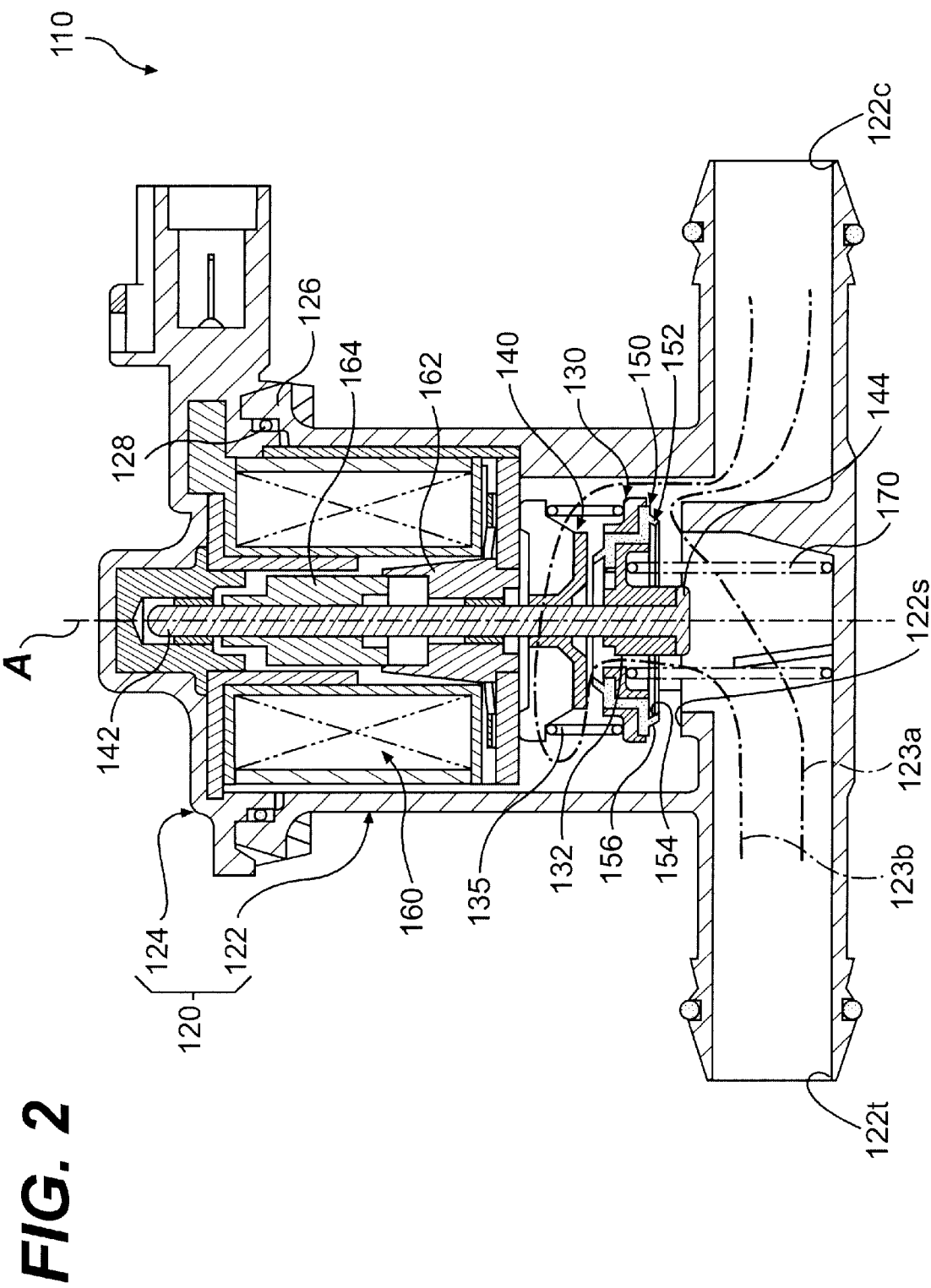
FIG. 2 is a sectional view of a dual-stage fuel tank isolation valve.

Referring additionally to FIG. 2, a first preferred embodiment of the fuel tank isolation valve 110 includes a housing 120, a valve assembly 130,140, and a seal 150. The housing can include a body 122 and a cover 124. The body 122 and the cover 124 can be made of any material that is suitable for contacting and containing fuel and/or fuel vapor and for housing an actuator 160. The body 122 and the cover 124 can be made of different materials or the same material, as long as the material is suitable for its intended purpose. The body 122 and the cover 124 can be a homogenous whole or separate components coupled together. Preferably, the body 122 and the cover 124 are separate components coupled together by at interlocking flange assembly 126. Alternative coupling techniques can be substituted for the interlocking flange assembly 126. A rubber O-ring 128 can provide a fluid-tight seal between the body 122 and the cover 124. Alternative sealing means, e.g., a gasket, can be substituted for the O-ring 128. Preferably, the housing 120 is constructed as described above; however, the housing 120 can alternatively be constructed as two separate halves divided along a central longitudinal axis A.

The body 122 includes an inlet port 122t for ingress of fuel vapor from an evaporative emission space of the fuel tank 16 and an outlet port 122c for egress of fuel vapor to the fuel vapor collection canister 12. Fluid communication between the inlet port 122t, which is at an inlet pressure level, and the outlet port 122c, which is at an outlet pressure level, can be along a first fluid communication path 123a. Typically, the inlet pressure level is greater than ambient pressure, while the outlet pressure level is less than ambient pressure. The valve assembly 130,140 controls fluid flow along the first fluid communication path 123a. As used herein, the term "fluid" can refer to a gaseous phase, a liquid phase, or a mixture of the gaseous and liquid phases. The term "fluid" preferably refers to the gaseous phase of a volatile liquid fuel, e.g., a fuel vapor.

The valve assembly 130,140 is movable along the axis A with respect to the housing 120 between an open position, a closed position, and an intermediate position. The intermediate position is between the open and closed positions. As shown in FIG. 2, the open position permits substantially unrestricted fluid flow between the inlet and outlet ports 122t,122c. The closed position (not shown) substantially blocks fluid flow between the inlet and outlet ports 122t, 122c.

The open position, as shown in FIG. 2, permits substantially unrestricted fluid flow from the inlet port 122t to the outlet port 122c. In the open position, the valve assembly 130,140 is spaced from the body 122 such that fluid communication is permitted along the first fluid communication path 123a through a gap between the valve assembly 130, 140 and a sealing surface 122s of the body 122.

The closed position (not shown) substantially prevents fluid flow from the inlet port 122t to the outlet port 122c, and therefore isolates the fuel tank 16 from fluid communication with the rest of the evaporative emission control system 10. In the closed position (not shown), the seal 150 engages the sealing surface 122s of the body 112 such that the fluid communication along the first fluid communication path 123a is prevented. Moreover, fluid communication along a second fluid communication path 123b is prevented by a non-perforated valve element 140 of the valve assembly 130,140 occluding a perforated valve element 130 of the valve assembly 130,140. Preferably, the seal 150 sealingly engages the perforated and non-perforated valve elements 130,140 to prevent fluid communication through a gap between the perforated and non-perforated valve elements 130,140.

The non-perforated valve element 140 is fixed at an intermediate location of a shaft 142 that is displaced along the axis A by the actuator 160. A flange 144 at the end of the shaft 142 constrains relative movement of the perforated valve element 130 along the shaft 142. The perforated valve element 130 is slidable on the shaft 142 and biased toward the flange 144. Preferably, a coil spring 135, which can be centered around the axis A, extends between the perforated and non-perforated valve elements 130,140 to bias the perforated valve element 130 toward the flange 144.

To achieve the closed position, the valve assembly 130, 140 is displaced by the actuator 160 along the axis A toward the sealing surface 122s of the body 112. Initially the perforated and non-perforated valve elements 130,140 are displaced concurrently until the seal 150 on the perforated valve element 130 contacts the sealing surface 122s. Continued movement of the non-perforated valve element 140, the shaft 142, and the flange 144 compresses the coil spring 135 until the seal 150 on the perforated valve element 130 is contacted by the non-perforated valve element 140.

In the closed position, a rapid increase in fuel tank pressure, e.g., as a result of an impact that compresses the fuel tank 16, the valve assembly 130,140 provides a "blow-off" feature that permits fluid flow from the inlet port 122t to the outlet port 122c. This "blow-off" feature is activated when the inlet pressure at the inlet port 122t exceeds the actuating force of the actuator 160 acting on the valve assembly 130,140. When this occurs, the valve assembly 130,140 is displaced from the body 122 such that fluid communication is permitted through the gap between the valve assembly 130,140 and the sealing surface 122s.

The intermediate position (not shown) provides restricted fluid flow along the second fluid communication path 123b from the inlet port 122t to the outlet port 122c. In particular, the perforated valve element 130 includes at least one orifice 132 that is located radially inward of the seal 150. The total transverse cross-sectional area of the at least one orifice 132 is selected to permit fluid flow along the second fluid communication path 123b that is restricted relative to the first fluid communication path 123a.

To achieve the intermediate position, the valve assembly 130,140 is displaced by the actuator 160 only until the seal 150 on the perforated valve element 130 contacts the sealing surface 122s. Fluid flow along the first fluid communication path 123a is prevented and fluid flow along the second fluid communication path 123b is permitted. Thus, the only fluid flow between the inlet and outlet ports 122t,122c must pass through the at least one orifice 132, and through the gap between the perforated valve element 130 and the non-perforated valve element 140.

The seal 150 is located at an interface between the body 122 and the valve assembly 130,140. The seal 150 includes an annular extension 152 that projects obliquely with respect to the axis A in the open position. The annular extension 152 is preferably shaped as a hollow frustum. As shown, the annular extension 152 can include a transverse dimension that is generally constant with respect to the projection of the annular extension 152. The annular extension 152 can alternatively include a transverse dimension that tapers (not shown) with respect to the projection of the annular extension 152. In the case of the hollow frustum, an inner surface 154 of the hollow frustum generally confronts the axis A, and an outer surface 156 of the hollow frustum generally faces opposite the inner surface 154. The inner surface 154 is in fluid communication with the inlet port 122t when the valve assembly 130,140 is at the intermediate position. The outer surface 156 is in fluid communication with the outlet port 122c when the valve assembly 130,140 is at the intermediate position. When the inlet pressure is greater than the outlet pressure, the seal 150 is self-energizing between the intermediate and closed positions. Preferably, the seal 150 engages the sealing surface 122s of the body 122 in the closed and intermediate positions. The seal 150 is preferably molded on the perforated valve element 130, but can be include multiple pieces affixed to the perforated valve element 130, the non-perforated valve element 140, or the sealing surface 122s.

The actuator 160 can be an electromagnetic, piezoelectric, or any other type of actuator. Preferably, the actuator 160 is an electromagnetic solenoid actuator 160 that includes a stator 162 and an armature 164. The armature 164 is operatively connected to the shaft 142 and the stator 162 is fixed with respect to the housing 122, such that the armature 164 is displaceable along the axis A with respect to the stator 162. Preferably, at least one of the stator 162 and the cover 124 supports a bearing that guides the shaft 142.

A resilient element 170, preferably a coil spring that can be centered around the axis A, biases the valve assembly 130,140 toward the open position in opposition to the actuating force of the actuator 160. Thus, the open position is the normal and fail-safe modes of the valve 110. Preferably, the resilient element 170 extends between the perforated valve element 130 and an internal wall of the body 112. The resilient element 170 is selected to have a biasing rate, e.g., spring constant, which is lower than the resilient element 135 such that the actuator 160 compresses the resilient element 170 before the resilient element 135.

The actuator 160, which is preferably an electromagnetic solenoid, is operated by a signal supplied by the engine control management computer 22. This signal can be a constant current driver or a pulse-width-modulated signal. In the case of the pulse-width-modulated signal, at an approximately zero percent duty cycle, the fuel tank isolation valve 110 is in the open position, and at an approximately one hundred percent duty cycle, the fuel tank isolation valve 110 is in the closed position. Thus, when the actuator 160 is not energized, fluid communication is permitted along at least the first fluid communication path 123a. This provides the fail-safe mode such that excessive fuel vapor build-up is prevented in the fuel tank 16. Preferably, there is an approximately fifty percent duty cycle when the fuel tank isolation valve 110 is in the intermediate position.

Figure 3:
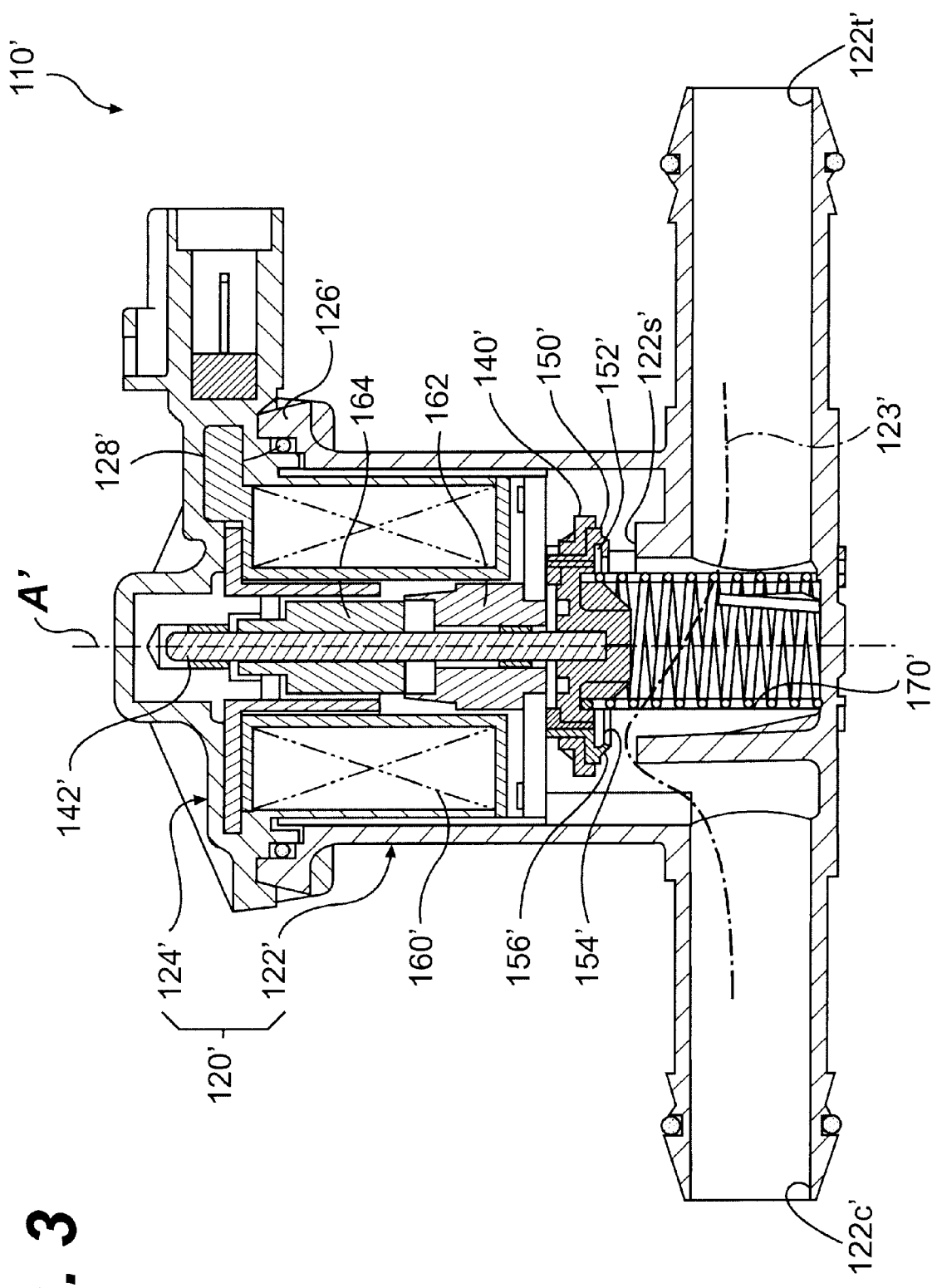
FIG. 3 is a sectional view of a single-stage fuel tank isolation valve.

Referring to FIG. 3, a second preferred embodiment of the fuel tank isolation valve 110' will now be described. The fuel tank isolation valve 110' includes a housing 120', a valve 140', and a seal 150'. The housing can include a body 122' and a cover 124'. The body 122' and the cover 124' can be made of any material that is suitable for contacting and containing fuel and/or fuel vapor and for housing an actuator 160'. The body 122' and the cover 124' can be made of different materials or the same material, as long as the material is suitable for its intended purpose. The body 122' and the cover 124' can be a homogenous whole or separate components coupled together. Preferably, the body 122' and the cover 124' are separate components coupled together by at interlocking flange assembly 126'. Alternative coupling techniques can be substituted for the interlocking flange assembly 126'. A rubber O-ring 128' can provide a fluid-tight seal between the body 122' and the cover 124'. Alternative sealing means, e.g., a gasket, can be substituted for the O-ring 128'. Preferably, the housing 120' is constructed as described above; however, the housing 120' can alternatively be constructed as two separate halves divided along a central longitudinal axis A'.

The body 122' includes an inlet port 122t' for ingress of fuel vapor from an evaporative emission space of the fuel tank 16 and an outlet port 122c' for egress of fuel vapor to the fuel vapor collection canister 12. Fluid communication between the inlet port 122t', which is at an inlet pressure level, and the outlet port 122c', which is at an outlet pressure level, can be along a fluid communication path 123'. Typically, the inlet pressure level is greater than ambient pressure, while the outlet pressure level is less than ambient pressure. The valve 140' controls fluid flow along the fluid communication path 123'.

The valve 140' is movable along the axis A' with respect to the housing 120' between an open position, a closed position, and an intermediate position. The intermediate position is between the open and closed positions. As shown in FIG. 3, the open position permits substantially unrestricted fluid flow between the inlet and outlet ports 122t', 122c'. The closed position (not shown) substantially blocks fluid flow between the inlet and outlet ports 122t',122c'.

The open position, as shown in FIG. 3, permits substantially unrestricted fluid flow from the inlet port 122t' to the outlet port 122c'. In the open position, the valve 140' is spaced from the body 122' such that fluid communication is permitted along the fluid communication path 123' through a gap between the valve 140' and a sealing surface 122s' of the body 122'.

The closed position (not shown) substantially prevents fluid flow from the inlet port 122t' to the outlet port 122c', and therefore isolates the fuel tank 16 from fluid communication with the rest of the evaporative emission control system 10. In the closed position (not shown), the seal 150' engages the sealing surface 122s' of the body 112' such that the fluid communication along the fluid communication path 123' is prevented. The valve 140' is fixed to a shaft 142' that is displaced along the axis A' by the actuator 160'.

To achieve the closed position, the shaft 142' and the valve 140' are displaced by the actuator 160' along the axis A' until the seal 150' on the valve 140' contacts the sealing surface 122s'.

In the closed position, a rapid increase in fuel tank pressure, e.g., as a result of an impact that compresses the fuel tank 16, the valve 140' provides a "blow-off" feature that permits fluid flow from the inlet port 122t' to the outlet port 122c'. This "blow-off" feature is activated when the inlet pressure at the inlet port 122t' exceeds the actuating force of the actuator 160' acting on the valve 140'. When this occurs, the valve 140' is displaced from the body 122' such that fluid communication is permitted through the gap between the valve 140' and the sealing surface 122s'.

The intermediate position (not shown) provides restricted fluid flow along the fluid communication path 123' from the inlet port 122t' to the outlet port 122c'.

To achieve the intermediate position, the valve 140' is displaced by the actuator 160' only until the seal 150' on the valve 140' closely approaches or initially contacts the sealing surface 122s'.

The seal 150' is located at an interface between the body 122' and the valve 140'. The seal 150' includes an annular extension 152' that projects obliquely with respect to the axis A' in the open position. The annular extension 152' is preferably shaped as a hollow frustum. As shown, the annular extension 152' can include a transverse dimension that is generally constant with respect to the projection of the annular extension 152'. The annular extension 152' can alternatively include a transverse dimension that tapers (not shown) with respect to the projection of the annular extension 152'. In the case of the hollow frustum, an inner surface 154' of the hollow frustum generally confronts the axis A', and an outer surface 156' of the hollow frustum generally faces opposite the inner surface 154'. The inner surface 154' is in fluid communication with the inlet port 122t' when the valve 140' is at the intermediate position. The outer surface 156' is in fluid communication with the outlet port 122c' when the valve 140' is at the intermediate position. When the inlet pressure is greater than the outlet pressure, the seal 150' is self-energizing between the intermediate and closed positions. Preferably, the seal 150' closely approaches or initially contacts the sealing surface 122s' of the body 122' in the closed and intermediate positions. The seal 130 deforms in response to a differential between the first and second pressure levels, such that at the intermediate position, there is a restricted, i.e., reduced, flow between the first and second ports 120,122. The deforming of the seal 130 can include fluttering in response to the differential between the inlet and outlet pressure levels. The seal 150' is preferably molded on the valve 140', but can be include multiple pieces affixed to the valve 140' or the sealing surface 122s'.

The actuator 160' can be an electromagnetic, piezoelectric, or any other type of actuator. Preferably, the actuator 160' is an electromagnetic solenoid actuator 160' that includes a stator 162' and an armature 164'. The armature 164' is operatively connected to the shaft 142' and the stator 162' is fixed with respect to the housing 122', such that the armature 164' is displaceable along the axis A' with respect to the stator 162'. Preferably, at least one of the stator 162' and the cover 124' supports a bearing that guides the shaft 142'.

A resilient element 170', preferably a coil spring that can be centered on the axis A', biases the valve 140' toward the open position in opposition to the actuating force of the actuator 160'. Thus, the open position is the normal and fail-safe modes of the valve 110'. Preferably, the resilient element 170' extends between the valve 140' and an internal wall of the body 112'.

The actuator 160', which is preferably an electromagnetic solenoid, is operated by a signal supplied by the engine control management computer 22. This signal can be a constant current driver or a pulse-width-modulated signal. In the case of the pulse-width-modulated signal, at an approximately zero percent duty cycle, the fuel tank isolation valve 110' is in the open position, and at an approximately one hundred percent duty cycle, the fuel tank isolation valve 110' is in the closed position. Thus, when the actuator 160' is not energized, fluid communication is permitted along the fluid communication path 123'. This provides the fail-safe mode such that excessive fuel vapor build-up is prevented in the fuel tank 16. Preferably, there is an approximately fifty percent duty cycle when the fuel tank isolation valve 110' is in the intermediate position.

The fuel tank isolation valves 110 and 110' provide low flow restriction during fuel tank re-fueling (i.e., in the open position), fail to an open state (i.e., the open position), and provide restricted flow during routine vehicle operation to ensure that a sufficient vapor pressure is maintained to suppress additional fuel vapor generation (i.e., the intermediate position). During purging of fuel vapor collection canister 12 (i.e., the closed position), excess hydrocarbons stored in the fuel vapor collection canister 12 are purged to the internal combustion engine 20. Thus, fuel tank isolation valves 110 and 110' isolate the fuel tank 16, thereby preventing purging directly from the vapor dome of the fuel tank 16.

Figure 4:
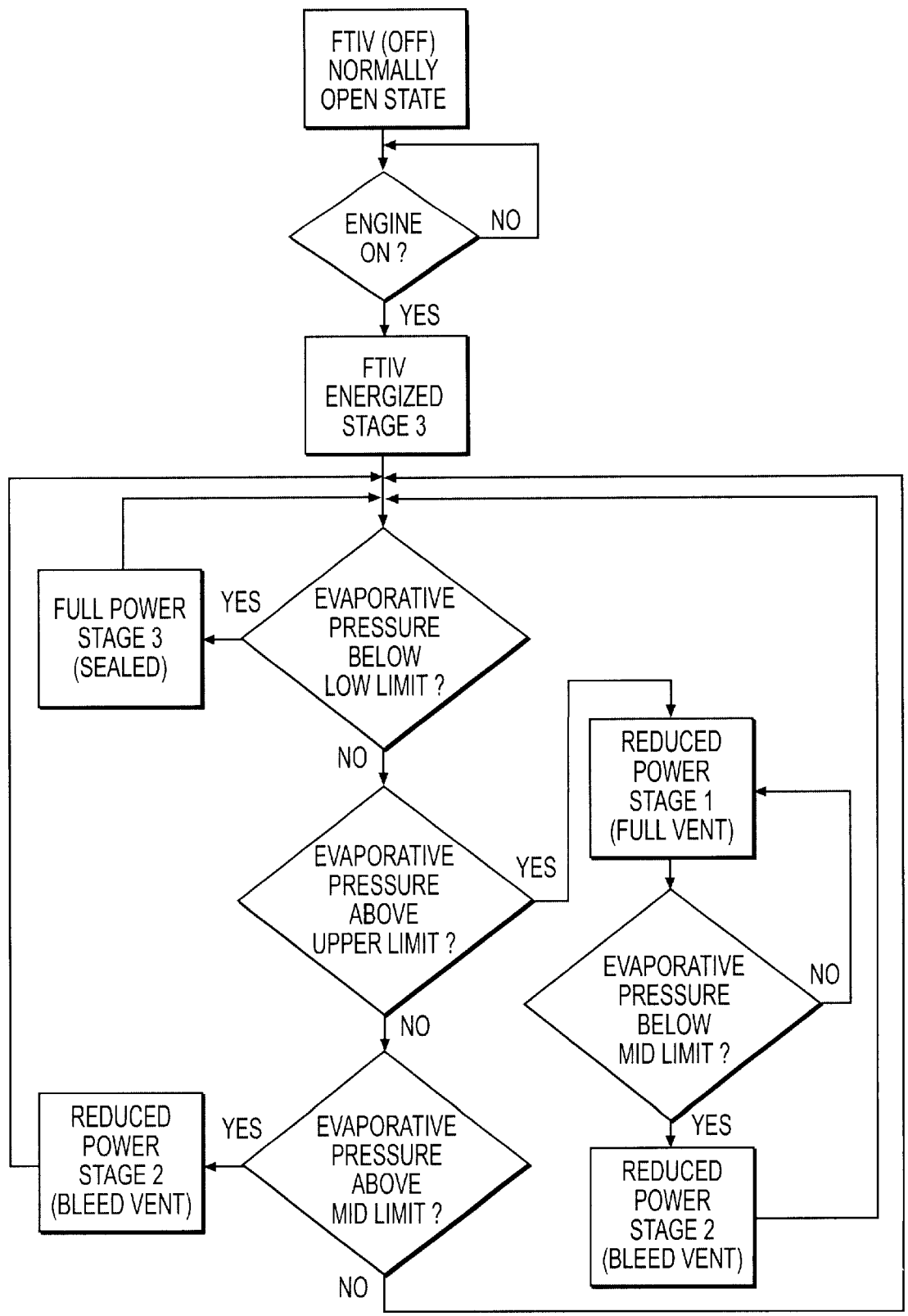
FIG. 4 is a flow chart illustrating a control algorithm for a dual stage fuel tank isolation valve.

Referring now to FIGS. 4–9, and initially to FIG. 4, a control algorithm for a dual stage fuel tank isolation valve, e.g., fuel tank isolation valve 110, illustrates that there are three operating stages that are implemented based on three pressure thresholds. The first operating stage is free venting, i.e., substantially unrestricted fuel vapor flow, and is implemented if the fuel vapor pressure in the fuel tank is greater than an upper limit. The second operating stage is bleed venting, i.e., restricted fuel vapor flow, and is implemented if the fuel vapor pressure in the fuel tank is less than the upper limit and greater than a mid limit. The second operating stage is also implemented if, after free venting, the fuel vapor pressure in the fuel tank is below the mid limit. The third operating stage is closed, i.e., fuel vapor flow is substantially prevented, and is implemented after starting an internal combustion engine and again if the fuel vapor pressure in the fuel tank is less than a lower limit.

Figure 5:
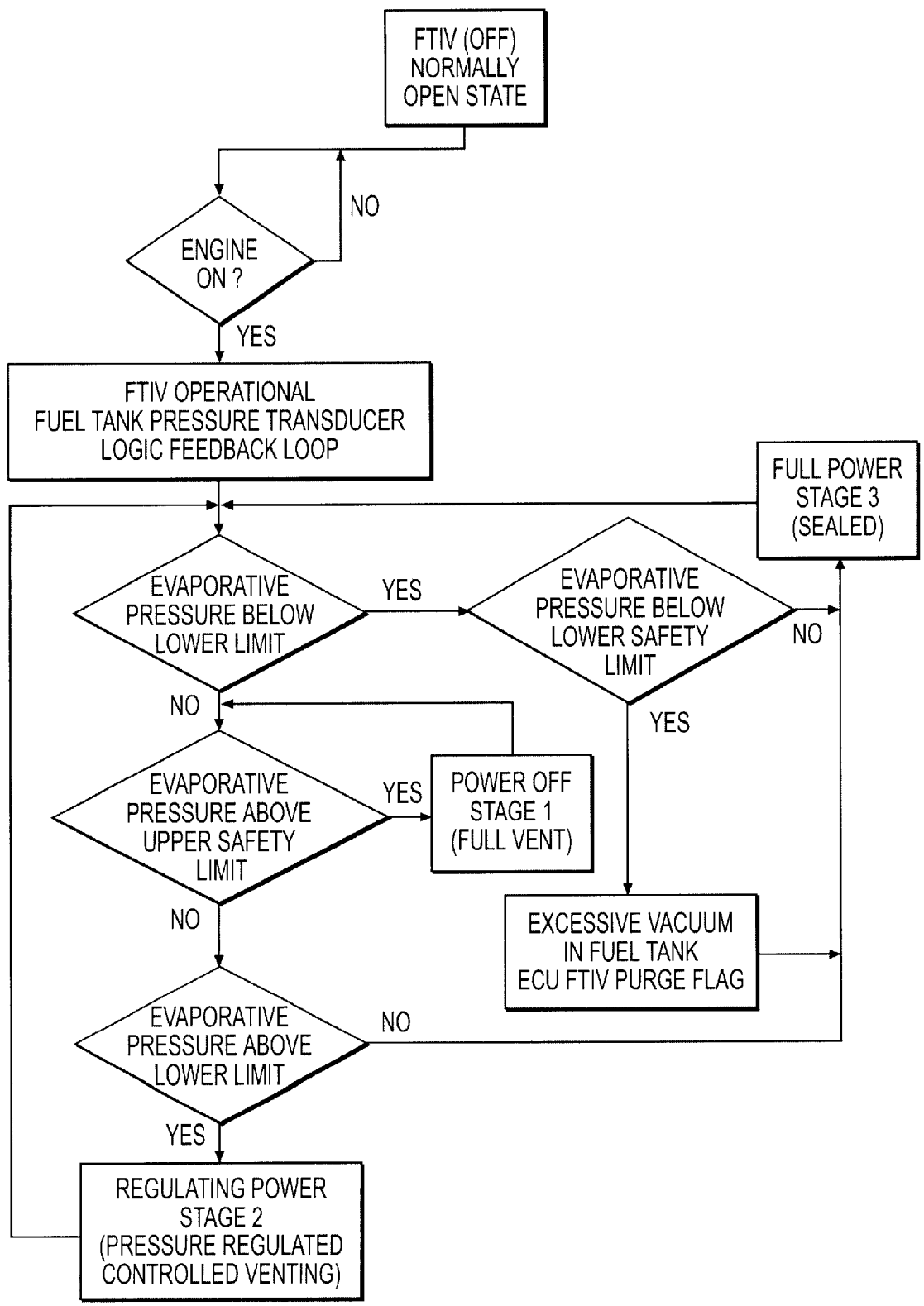
FIG. 5 is a flow chart illustrating a control algorithm for a single stage fuel tank isolation valve.

Referring now to FIG. 5, a control algorithm for a single stage fuel tank isolation valve, e.g., fuel tank isolation valve 110', illustrates that there are three operating stages and one flag signal that are implemented based on four pressure thresholds. The first operating stage is free venting, i.e., substantially unrestricted fuel vapor flow, and is implemented if the fuel vapor pressure in the fuel tank is greater than an upper safety limit. The second operating stage is regulated pressure venting, i.e., restricted fuel vapor flow, and is implemented if the fuel vapor pressure in the fuel tank is less than the upper safety limit and greater than a lower limit. The third operating stage is fully closed, i.e., fuel vapor flow is substantially prevented, and is implemented if the fuel vapor pressure in the fuel tank is less than the lower limit and greater than a lower safety limit. The lower safety limit is less than the lower limit. If the fuel vapor pressure in the fuel tank is less than the lower safety limit, the fuel tank isolation valve can output an electric flag signal and the third operating stage is implemented. The electric flag signal can be output to the engine control management computer 22 to indicate that direct purging of the fuel tank may be occurring. The regulating power level of the fuel tank isolation valve is sensitive to certain parameters such as fuel vapor temperature and fuel vapor collection canister pressure. Therefore, a logic control feedback loop that uses a sensor measuring fuel vapor in the fuel tank or the purge valve control signal can determine the appropriate dynamic power level for the fuel tank isolation valve.

Figure 6:
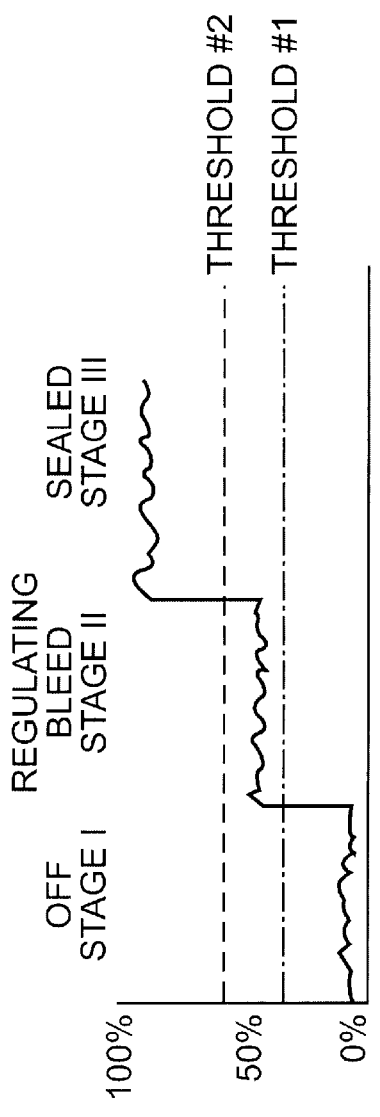
FIG. 6 is a graph illustrating different operating stages of a dual stage fuel tank isolation valve.
Figure 7A:
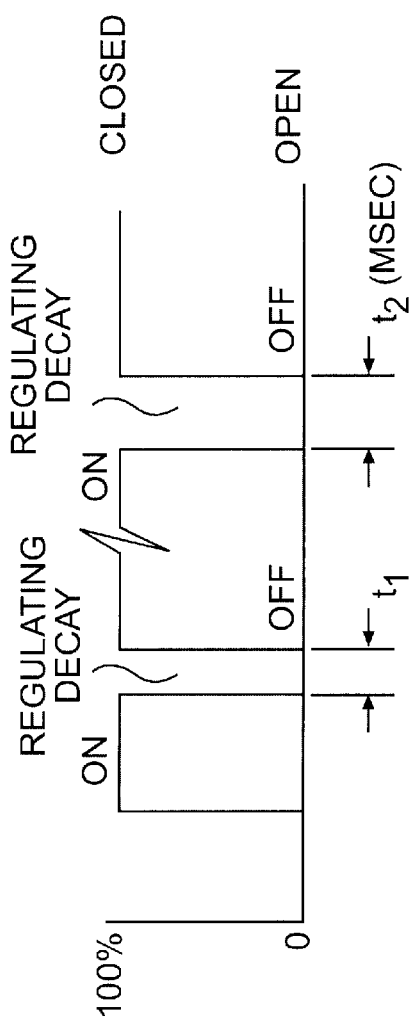
FIG. 7A is a graph illustrating a first strategy for controlling a single stage fuel tank isolation valve.
Figure 7B:
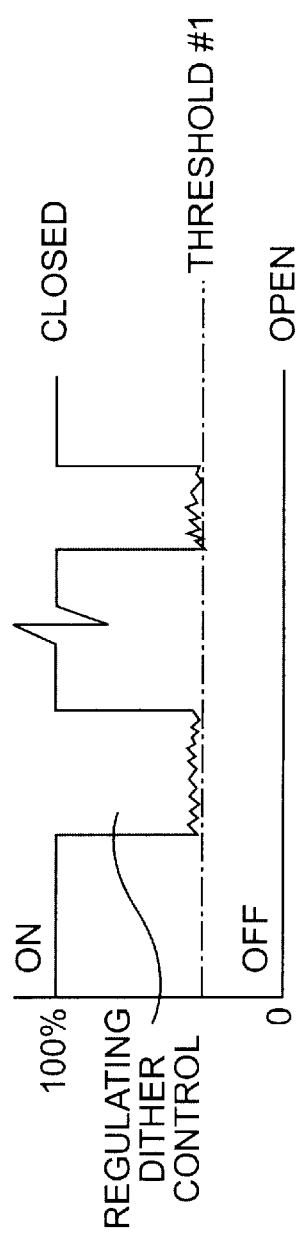
FIG. 7B is a graph illustrating a second strategy for controlling a single stage fuel tank isolation valve.

Referring now to FIGS. 6, 7A, and 7B, different types of control signals may be supplied to the actuators of fuel tank isolation valves 110 and 110'. FIG. 6 shows a pulse-width-modulated signal can be supplied to the actuator of a dual stage fuel tank isolation valve to implement different operating stages. A null magnitude signal allows substantially unrestricted fuel vapor flow in a "nominally open" fuel tank isolation valve. An approximately 100% duty cycle pulse-width-modulated signal can be supplied to implement a sealed stage, i.e., fuel vapor flow is substantially prevented. And a regulated bleed stage can be implemented using a pulse-width-modulated signal having a duty cycle that is a fraction of the pulse-width-modulated signal for the sealed stage. Preferably, the regulated bleed stage has an approximately 50% duty cycle.

FIG. 7A shows a digital ON/OFF signal that can be supplied to the actuator of a single stage fuel tank isolation valve. Varying the digital OFF time periods can regulate the decay of fuel vapor pressure in the fuel tank. FIG. 7B shows an intermittent pulse-width-modulated signal that can be supplied to the actuator of a single stage fuel tank isolation valve. The time period of supplying this pulse-width-modulated signal can be used to control dithering of a valve body.

Figure 8:
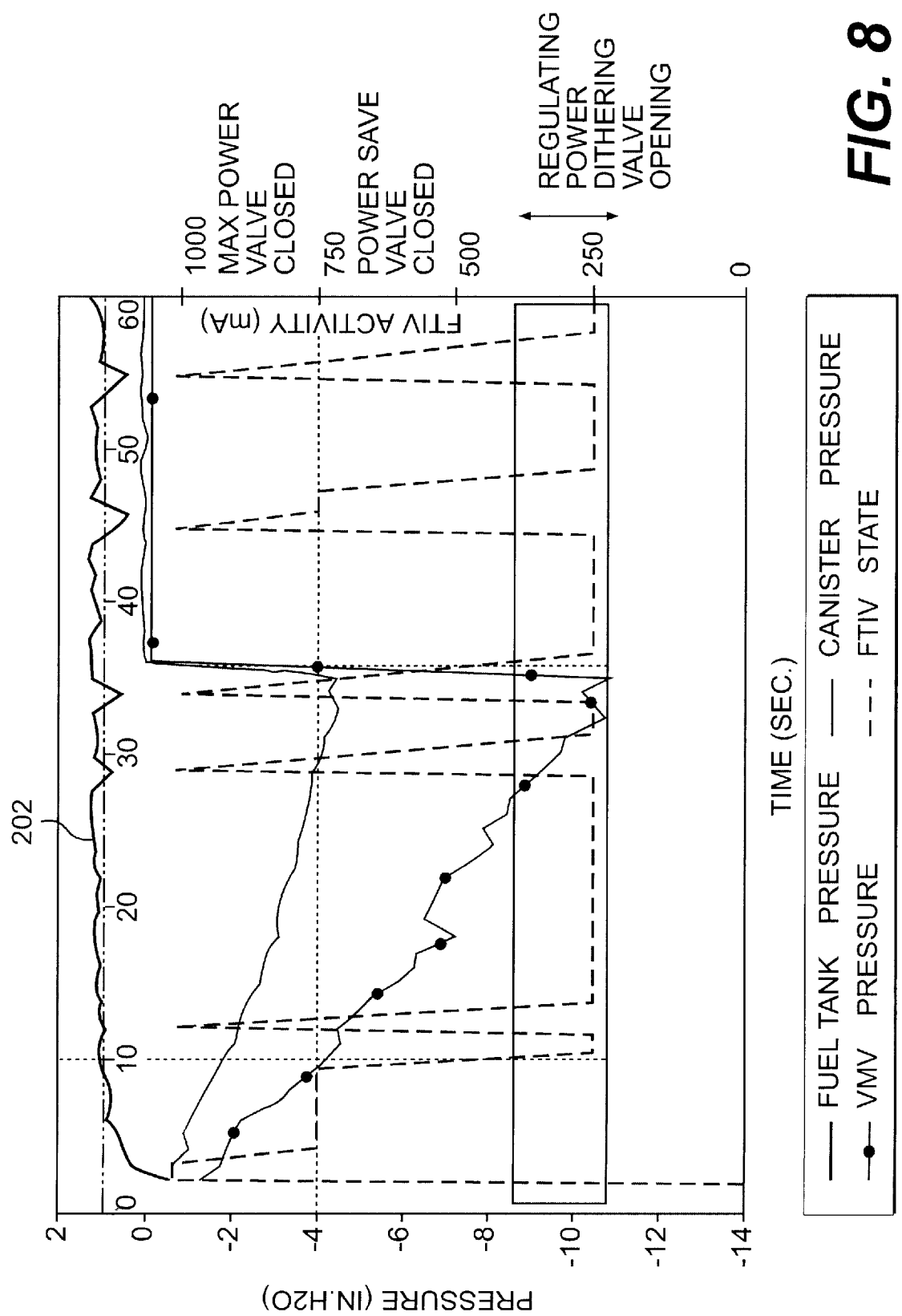
FIG. 8 is a graph illustrating a relationship between fuel tank pressure and an operating state of a fuel tank isolation valve.

FIG. 8 shows the effect of the activity of a fuel tank isolation valve (curve 200) on the vapor pressure in the fuel tank (curve 202). FIG. 8 also shows that power consumption by the fuel tank isolation valve can be lowered by reducing the current in the actuator coil after an approximately maximum current has been supplied to initially "hard close" the valve body.

Figure 9:
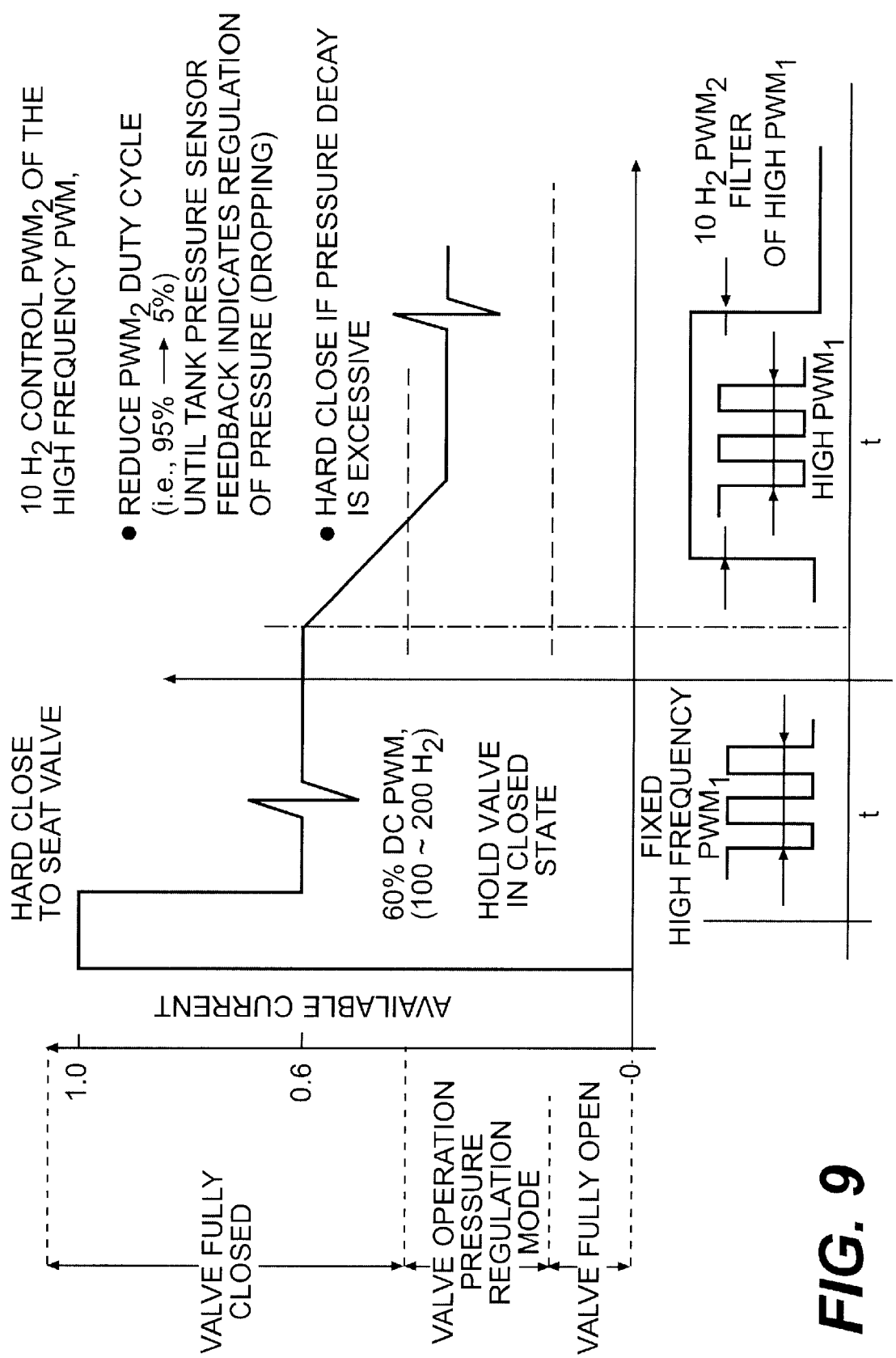
FIG. 9 is a graph illustrating an electric signal for controlling a fuel tank isolation valve.

FIG. 9 shows that a relatively low frequency (e.g., 10 Hz) pulse-width-modulated signal $PWM_2$ can be used to dither a relatively high frequency (e.g., 100–200 Hz) pulse-width-modulated signal $PWM_1$. Thus, after hard setting to close a valve body, the relatively high frequency pulse-width-modulated signal $PWM_1$ can be used to reduce power consumption while maintaining the valve body closed. Thereafter, turning the relatively high frequency pulse-width-modulated signal $PWM_1$ on and off according to the relatively low frequency pulse-width-modulated signal $PWM_2$ can facilitate dithering the valve body.

Operating a fuel tank isolation valve as described above is believed to provide many advantages. These advantages are believed to include: 1) reducing hydrocarbon spikes while still permitting aggressive purging of the fuel vapor collection canister; 2) isolating fresh hydrocarbon vapors in the fuel tank during purging; 3) minimizing engine faltering due to hydrocarbon vapor spikes; 4) pressure regulation that allows for controlled over-pressure venting that may be necessary due to fuel slosh and sudden stop hydrocarbon vapor spikes; 5) pressure regulation that allows refueling while the engine is running; 6) maximizing purge capabilities of the fuel vapor collection canister; 7) reducing hydrocarbon stores in the fuel vapor collection canister (these stores could undesirably be released during an emission shed soak test; and 8) enabling a vehicle to be "partial zero emission" capable in accordance with California and Federal emission requirements.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of operating a fuel tank isolation valve, the fuel tank isolation valve having a first port in fluid communication with a fuel vapor collection canister, a second port in fluid communication with a fuel tank, and an electric actuator moving a valve body to control fluid communication between the first and second ports, the method comprising:

supplying a first electric signal to the electric actuator such that the valve body permits substantially unrestricted fuel vapor flow between the first and second ports;

supplying a second electric signal to the electric actuator such that the valve body substantially prevents fuel vapor flow between the first and second ports; and supplying a third electric signal to the electric actuator such that the valve body provides restricted fuel vapor flow between the first and second ports.

2. The method according to claim 1, wherein the first electric signal comprises a null magnitude signal.

3. The method according to claim 1, wherein the second and third electric signals comprise pulse-width-modulated signals.

4. The method according to claim 3, wherein the third electric signal comprises a duty cycle that is a fraction of a duty cycle of the second electric signal.

5. The method according to claim 4, wherein the duty cycle of the third electric signal is approximately half of the duty cycle of the second electric signal.

6. The method according to claim 5, wherein the duty cycle of the second electric signal is approximately one hundred percent, and the duty cycle of the third electric signal is approximately fifty percent.

7. The method according to claim 1, wherein the second electric signal comprises a constant current electric signal.

8. The method according to claim 7, wherein the third electric signal comprises digital ON and digital OFF electric signals.

9. The method according to claim 1, further comprising:

sensing a parameter of at least one of the fuel tank and the fuel vapor collection canister.

10. The method according to claim 9, further comprising:

selecting one of the second and third electric signals to be supplied to the electric actuator, the selecting being responsive to the sensing.

11. The method according to claim 9, further comprising:

adjusting the third electric signal to be supplied to the electric actuator, the adjusting being responsive to the sensing.

12. The method according to claim 9, wherein the parameter comprises at least one of fuel vapor temperature, fuel vapor pressure in the fuel vapor collection canister, and fuel vapor pressure in the fuel tank.

13. The method according to claim 1, wherein the second electric signal comprises a first pulse-width-modulated electric signal and a second pulse-width-modulated electric signal, the second pulse-width-modulated electric signal having a relatively lower duty cycle than the first pulse-width-modulated electric signal.

14. The method according to claim 1, wherein the third electric signal comprises a pulse-width-modulated electric signal such that the electric actuator dithers the valve body.

15. The method according to claim 1, wherein the supplying the first electric signal is implemented when pressure in the fuel tank is greater than an upper limit;

wherein the supplying the second electrical signal is implemented when pressure in the fuel tank is less than a lower limit; and wherein the supplying the second electrical signal is implemented when pressure in the fuel tank is less than the upper limit and greater than a mid limit, and when pressure in the fuel tank is greater than the mid limit and less than the upper limit.

16. The method according to claim 15, further comprising:

outputting an electric flag signal when pressure in the fuel tank is less than a lower safety limit, the lower safety limit being less than the lower limit.

17. The method according to claim 16, the outputting an electric flag signal indicating direct purging of the fuel tank.

18. The method according to claim 15, wherein the upper limit comprises an upper safety limit.

\* \* \* \* \*